US00RE38248E

(19) United States
(12) Reissued Patent
Yu et al.

(10) Patent Number: US RE38,248 E
(45) Date of Reissued Patent: Sep. 16, 2003

(54) METHOD FOR REDUCING SURFACE ROUGHNESS IN A WELDED SEAM OF AN IMAGING BELT

(75) Inventors: Robert C. U. Yu, Webster, NY (US); William A. Hammond, Rochester, NY (US); Edward L. Schlueter, Jr., Rochester, NY (US); Constance J. Thornton, Ontario, NY (US)

(73) Assignee: Xerox Corporation, Stamford, CT (US)

(21) Appl. No.: 10/094,158

(22) Filed: Mar. 6, 2002

Related U.S. Patent Documents

Reissue of:
(64) Patent No.: 6,336,982
Issued: Jan. 8, 2002
Appl. No.: 09/579,283
Filed: May 30, 2000

(51) Int. Cl.[7] ..... B32B 31/00
(52) U.S. Cl. ..... 156/64; 156/73.4; 156/137; 156/311
(58) Field of Search ..... 156/64, 73.1, 73.4, 156/137, 157, 304.1, 311, 358, 359, 498, 499, 583.1

(56) References Cited

U.S. PATENT DOCUMENTS

| | | | | | |
|---|---|---|---|---|---|
| 4,265,990 | A | * | 5/1981 | Stolka et al. | 430/59 |
| 4,883,742 | A | * | 11/1989 | Wallbillick et al. | 430/275 |
| 5,552,005 | A | * | 9/1996 | Mammino et al. | 156/157 |
| 6,042,917 | A | * | 3/2000 | Schlueter, Jr. et al. | 428/60 |
| 6,056,839 | A | * | 5/2000 | Yu et al. | 156/137 |
| 6,068,722 | A | * | 5/2000 | Yu et al. | 156/137 |
| 6,074,504 | A | * | 6/2000 | Yu et al. | 156/137 |

* cited by examiner

*Primary Examiner*—James Sells
(74) *Attorney, Agent, or Firm*—Wayne J. Egan

(57) ABSTRACT

A welded seam of an imaging belt comprises a surface roughness. To reduce the surface roughness, the welded seam is treated by compressing a portion of the belt comprising the welded seam and adjacent belt portions and, while compressing, heating the welded seam to a heating temperature near but less than the glass transition temperature of the imaging layer of the belt, then cooling the welded seam to a cooling temperature. The compressing continues while the heating and cooling steps are repeated until the surface roughness is determined to be satisfactory. The process then ceases.

20 Claims, 4 Drawing Sheets

METHOD FOR REDUCING SURFACE ROUGHNESS IN A WELDED SEAM OF AN IMAGING BELT

Matter enclosed in heavy brackets [ ] appears in the original patent but forms no part of this reissue specification; matter printed in italics indicates the additions made by reissue.

FIELD OF THE INVENTION

This invention relates in general to imaging belts and, more specifically, to a process for reducing surface roughness in a welded seam of an imaging belt.

BACKGROUND OF THE INVENTION

Flexible imaging member belts in electrostatographic imaging system are well known in the art. Typical flexible imaging member belt include, for example, electrophotographic imaging member belts for photoreceptors for electrophotographic imaging systems, ionographic imaging member belts or electroreceptors for electrographic imaging systems, and intermediate image transfer belts for transferring toner images used in an electrophotographic or an electrographic imaging system. These belts are usually formed by cutting a rectangular sheet from a web containing at least one layer of thermoplastic polymeric material, overlapping opposite ends of the sheet, and joining the overlapped ends together to form a welded seam. The seam extends from one edge of the belt to the opposite edge. Generally, these belts comprise at least a supporting substrate layer and at least one imaging layer comprising thermoplastic polymeric matrix material. The "imaging layer" as employed herein is defined as the charge transport layer of an electrophotographic imaging member belt, the dielectric imaging layer of an ionographic imaging member belt, and the transfer layer of an intermediate transfer belt. Thus, the thermoplastic polymeric matrix material in the imaging layer is located in the upper portion of a cross section of an electrostatographic imaging member belt whereas the substrate layer being in the lower portion of the cross section of the electrostatographic imaging member belt. In the event that the imaging member exhibits upward curling, an anti-curl backing layer is coated to the back side (opposite to the side of the imaging layer) of the substrate layer. Although the flexible electrostatographic imaging member belts of interest include the mentioned types, for simplicity reasons, the discussion hereinafter will be focused on the electrophotographic imaging member belts as the representation.

Flexible electrophotographic imaging member belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. A typical layered photoreceptor having separate charge generating (photogenerating) and charge transport layers is described in U.S. Pat. No. 4,265,990, the disclosure of the foregoing patent being hereby incorporated by reference verbatim, with the same effect as though such disclosure were fully and completely set forth herein. The charge generating layer is capable of photogenerating holes and injecting the photogenerated holes into the charge transport layer.

The flexible electrophotographic imaging member belts are fabricated from a sheet cut from an imaging member web. The sheets are generally rectangular or parallelogram in shape. All edges may be of the same length or one pair of parallel edges may be longer than the other pair of parallel edges. The sheets are formed into a belt by joining the overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. However, ultrasonic welding is generally the chosen method for flexible imaging member seam joining because it is rapid, clean (no solvents), produces a thin and narrow seam, and a low cost seaming technique. In addition, ultrasonic welding is preferred because the mechanical pounding of the welding horn causes generation of heat at the contiguous overlapping end marginal regions of the sheet to maximize melting of one or more layers therein to form a strong seam joint. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

When ultrasonically welded into a belt, the seam of flexible multilayered electrophotographic imaging member belts may occasionally contain undesirable high protrusions such as peaks, ridges, spikes, and mounds. These seam protrusion spots present problems during image cycling of the belt in the machine because they interact with cleaning blades to cause blade wear and tear which ultimately affect cleaning blade efficiency and service life. Moreover, the protrusion high spots in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a tonor donor roll and the imaging surface of the belt imaging member.

Since there is no effective way to prevent the generation of localized high protrusions at the seam, imaging member belts are inspected, right after seam welding belt production process, manually by hand wearing a cotton glove through passing the index finger over the entire seam length and belts found catching the glove by the protrusions are identified as production rejects. Both the time consuming procedure of manual inspection and the number of seamed belts rejected due to the presence of high seam protrusions constitute a substantial financial burden on the production cost of imaging member belts.

Therefore, there is a need to provide seamed flexible imaging belts with an improved seam morphology which is free of protrusion spots to interact against the machine operational subsystems. Furthermore, the successful preparation of flexible imaging member belts having improved seam morphology without protrusion spots can also eliminate the cleaning blade's nicking problem as well as enhance the blade's cleaning efficiency and extends its functional life. Very importantly, from the imaging member belt production point of view, that effective cutting of unit manufacturing cost of seamed imaging belts can be achieved if an innovative post seaming treatment process can be developed to remove the undesirable protrusion spots, provide a smoother seam surface morphology, and good mechanical seam strength.

Some prior art references are now discussed. U.S. Pat. No. 5,552,005 to Mammino et al., issued Sep. 3, 1996, discloses a flexible imaging sheet and a method of constructing a flexible imaging sheet. The method of constructing a flexible imaging sheet comprises a step of overlapping, a step of joining, and a step of shaping. In the step of overlapping, a first marginal end region and a second marginal end region of a sheet are overlapped to form an overlap region and a non-overlap region. In the step of joining, the first marginal end region and the second marginal end region of the sheet are joined to one another by a seam in the overlap region. In the step of shaping, the overlap region is shaped to form a generally planar surface co-planar with a surface of the non-overlap region. The flexible imaging sheet comprises a first marginal end region and a second marginal end region. The first marginal end region and the second marginal end region are secured by a seam to one another in the overlap region. The first marginal end region and the second marginal end region are substantially co-planar to minimize stress on the flexible imaging sheet. Minimization of stress concentration, resulting from dynamic bending of the flexible imaging sheet during cycling over a roller within an electrophotographic imaging apparatus, is particularly accomplished in the present invention.

U.S. Pat. No. 4,883,742 to Walibillich et al., issued Nov. 28, 1989, discloses a process for seamless and firm joining of the end and/or lateral areas of thermoplastically processible photosensitive layers, by which the end and/or lateral areas of one or more solvent-free and unsupported thermoplastically processible photosensitive layers are overlapped avoiding bubbles and with displacement of the air between the end and/or lateral areas, the total layer material is then heated under pressure and with joining of the overlapping end and/or lateral areas, and the resulting continuously joined photosensitive layer is then after treated and smoothed with shaping to exact size.

The disclosures of the foregoing U.S. patents to Mammino and Wallbillich are hereby incorporated by reference verbatim, with the same effect as though such disclosures were fully and completely set forth herein.

While the above references disclose a variety of approaches for improving the seam of flexible imaging member belts, these disclosed approaches are either insufficient to meet the expectation, or often time introduce new set of undesirable outcomes such as seam vicinity imaging member wrinkling and belt circumferential dimension shrinkage.

Therefore, there is a need for developing a method for fabricating a flexible imaging member belt having an improved ultrasonically welded seam free of protrusion spots, with a smoother surface morphology, and free of spikes that are likely to damage the imaging machine subsystems.

SUMMARY OF THE INVENTION

In one aspect of the invention, there is provided a method for reducing surface roughness in a welded seam of an imaging belt, the imaging belt comprising first and second ends, the first and second ends overlapping and thereat joined by a welded seam, the welded seam comprising a surface roughness, the belt comprising an imaging layer, a glass transition temperature corresponding to the imaging layer, the process comprising the steps of:

at a fixed pressure, compressing a belt portion comprising the welded seam and belt end portions adjacent thereto and, while compressing:

heating the welded seam to a heating temperature near but less than the glass transition temperature;

then cooling the welded seam to a cooling temperature;

the compressing, heating and cooling reducing the surface roughness; and then determining when the surface roughness is satisfactory.

DETAILED DESCRIPTION OF THE PREFERRED EMBODIMENTS

In brief, a process for reducing surface roughness in a welded seam of an imaging belt is provided. In accordance with the present invention, the welded seam is treated by compressing a portion of the belt comprising the welded seam and adjacent belt portions and, while compressing, heating the welded seam to a heating temperature near but less than the glass transition temperature of the imaging layer of the belt, then cooling the welded seam to a cooling temperature. The compressing continues while the heating and cooling steps are repeated until the surface roughness is determined to be satisfactory. The process then ceases.

As used herein, the words "process" and "method" have identical meanings and may be used interchangeably.

Figure 1:
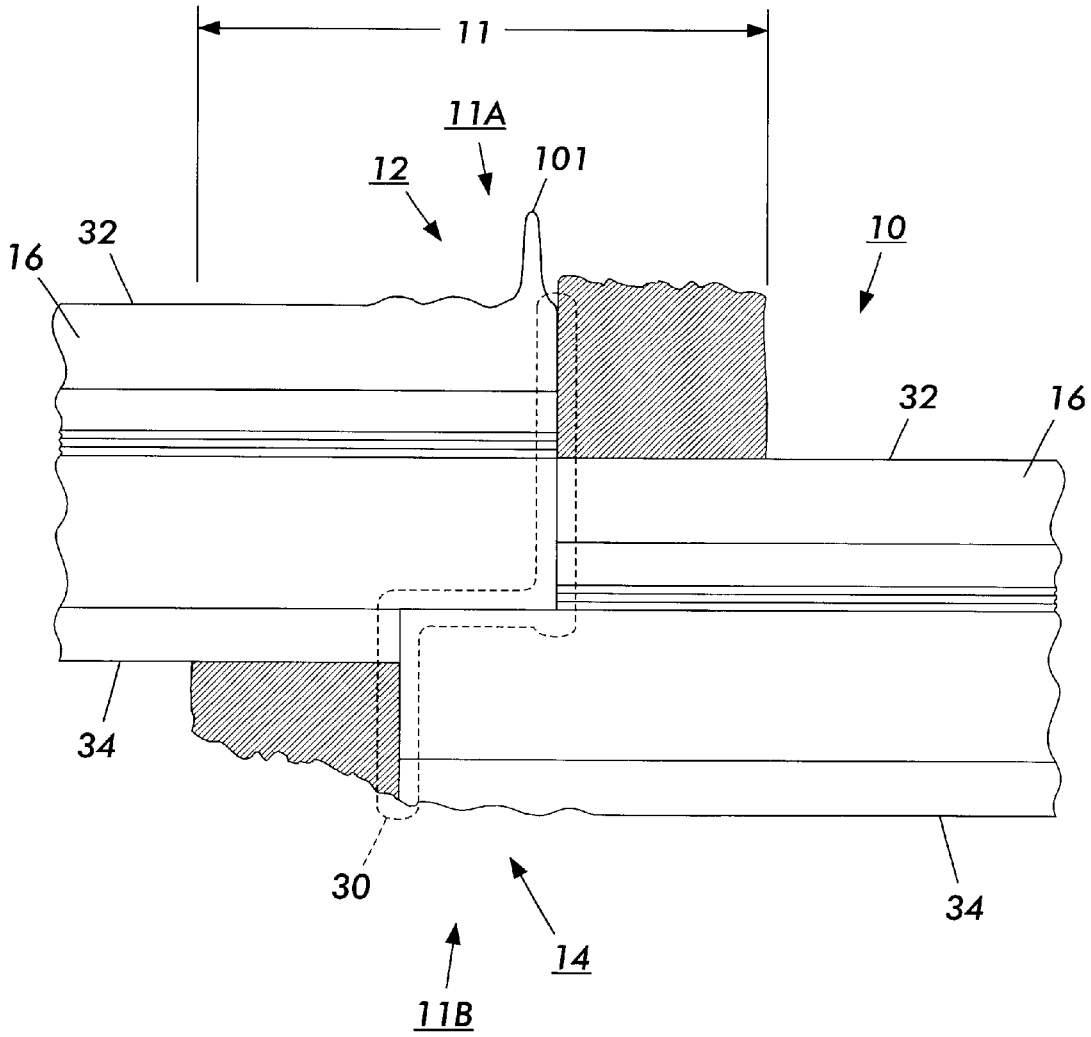
FIG. 1 PRIOR ART
FIG. 1 depicts a prior art imaging belt 10 with first 12 and second 14 ends overlapping and joined by a welded seam 11, the welded seam 11 including a surface roughness comprising a high protrusion spike 101.

Referring now to FIG. 1, there is shown a prior art electrophotographic imaging belt 10 with a first end 12 and a second end 14. The imaging belt 10 is flexible, and includes an outer surface 32 and an inner surface 34. As shown, the first end 12 and the second end 14 overlap in a region 30, the ends 12 and 14 being joined in the region 30 by an ultrasonic welding process, thus forming a welded seam 11. As shown, the welded seam 11 includes an outer welded seam region 11A and an inner welded seam region 11B. Also as shown, the welded seam 11 includes a surface roughness comprising, for example, at least one high protrusion spike 101.

In one embodiment of FIG. 1, the welded seam 11 is formed by means of an ultrasonic welding process.

Still referring to FIG. 1, as depicted the belt 10 comprises an imaging layer 16. Moreover, it will be understood by those skilled in the art that the imaging layer 16 may be characterized by one or more physical parameters including, for example, a corresponding glass transition temperature.

Figure 2:
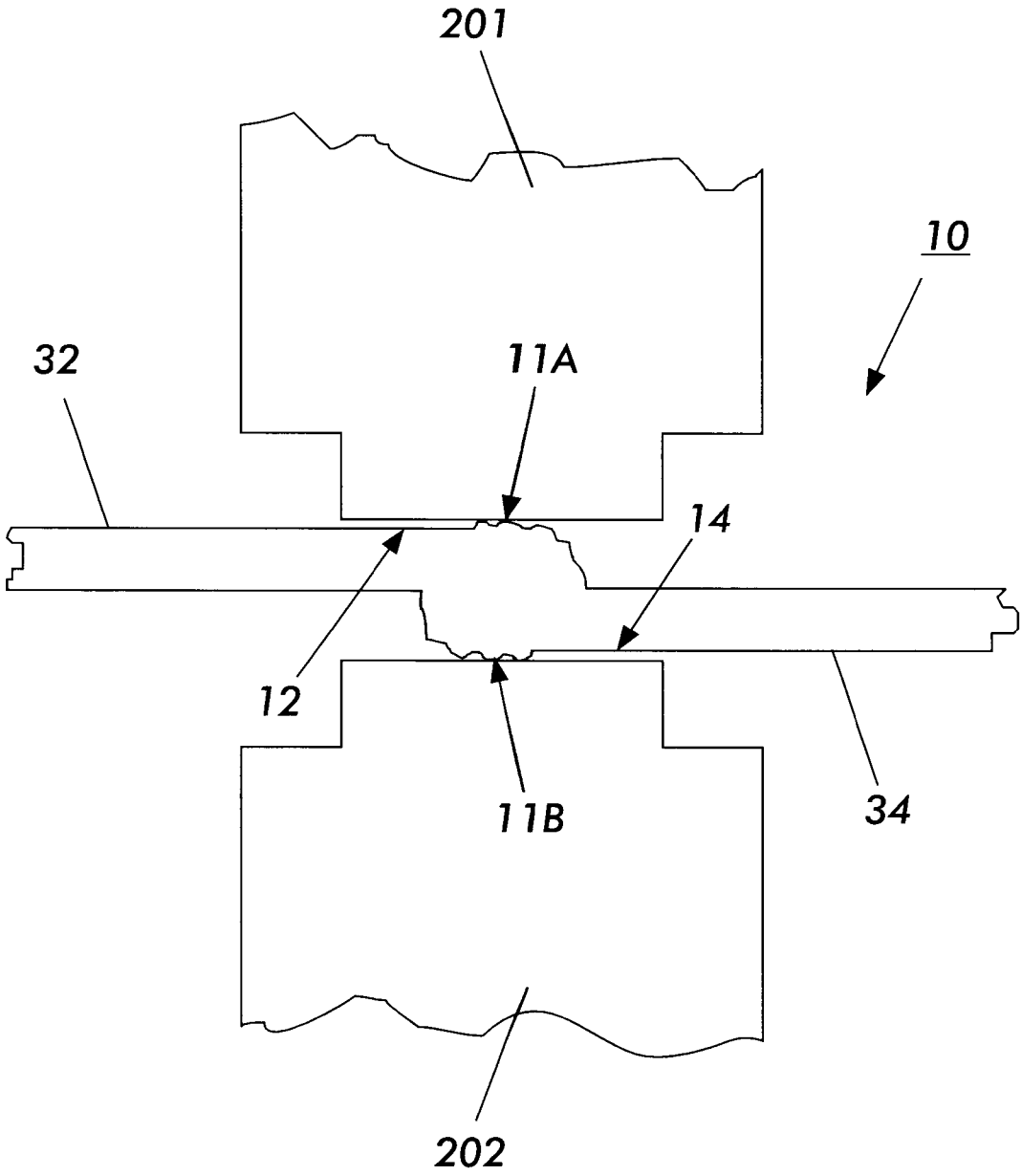
FIG. 2 depicts the belt 10 and welded seam 11 arranged with compressing and heating element 201 and compressing element 202, the arrangement suitable for demonstrating one embodiment of the present invention.

Referring now to FIG. 2, there is shown the belt 10 and welded seam 11 of FIG. 1 arranged with a compressing and heating element 201 and a compressing element 202. As will be discussed more fully in connection with FIG. 4 below, the arrangement of FIG. 2 is suitable for demonstrating one embodiment of the present invention.

Figure 3:
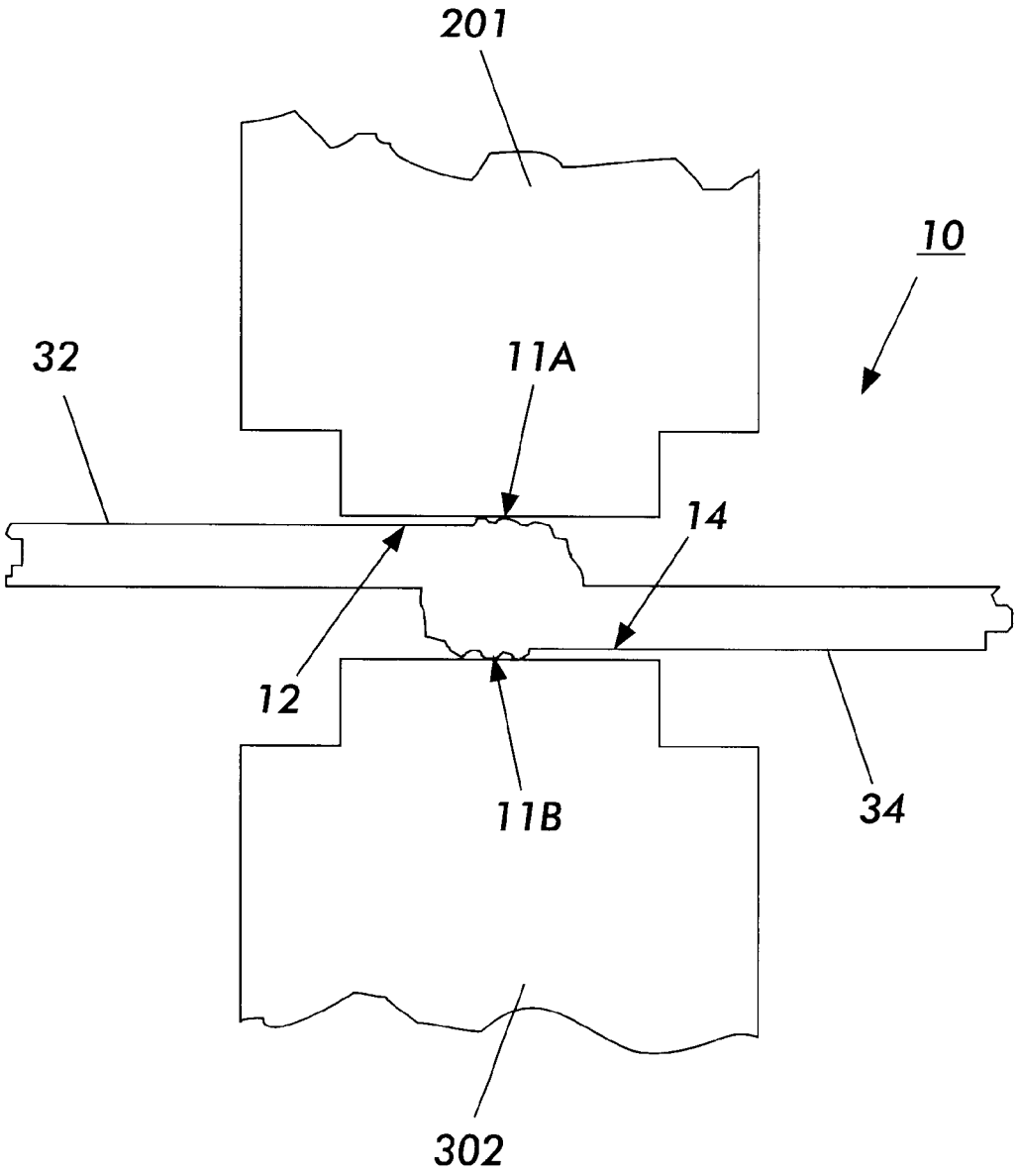
FIG. 3 depicts the belt 10 and welded seam 11 arranged with compressing and heating element 201 and compressing and heating element 302, the arrangement suitable for demonstrating a further embodiment of the present invention.

Referring now to FIG. 3, there is shown the belt 10 and welded seam 11 of FIG. 1 arranged with a first compressing and heating element 201 and a second compressing and heating element 302. It will be understood that the element 201 of FIG. 3 is identical to the element 201 of FIG. 2. As will be discussed more fully in connection with FIG. 4 below, the arrangement of FIG. 3 is suitable for demonstrating a further embodiment of the present invention.

Figure 4:
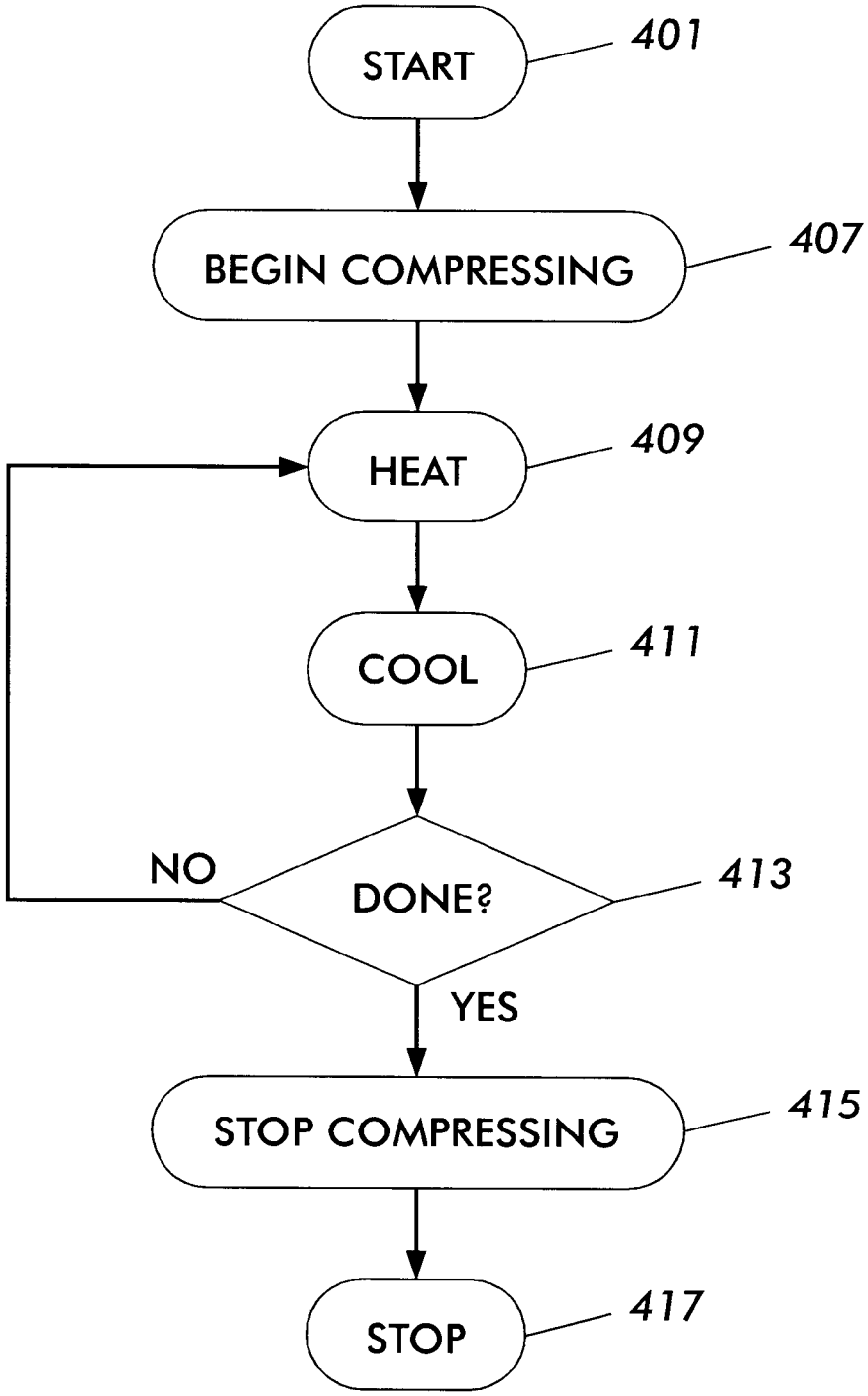
FIG. 4 is a flow diagram of the present invention.

Referring now to FIG. 4, there is shown one embodiment of a flow diagram of the present invention. By means of this process, the surface roughness of the welded seam 11 is reduced in accordance with the method comprising steps 401–407 depicted in FIG. 4.

After starting, step 401, the process goes to step 407.

In step 407, at a controlled pressure, a belt portion comprising the welded seam 11 and belt end portions adjacent thereto are compressed together.

In one embodiment, the outer welded seam region 11A and the inner welded seam region 11B are compressed together by the compressing and heating element 201 and the compressing element 202 as depicted in FIG. 2.

In another embodiment, the outer welded seam region 11A and the inner welded seam region 11B are compressed together by the first compressing and heating element 201 and the second compressing and heating element 302 as depicted in FIG. 3.

In one embodiment, the controlled pressure substantially between 40 and 80 pounds per square inch.

While the compressing forces that were initially applied in step 407 continues to be maintained, the process goes to step 409.

In step 409, the welded seam 11 is heated for a fixed heating time period to a heating temperature near but less than the glass transition temperature of imaging layer 16. As explained below, this heating of the welded seam 11 can be done in at least two ways.

In one embodiment, the welded seam 11 is heated by means of the compressing and heating element 201 applying heat to outer welded seam region 11A as depicted in FIG. 2.

In another embodiment, as depicted in FIG. 3, the welded seam 11 is heated by means of the first compressing and heating element 201 applying heat to the outer welded seam region 11A and the second compressing and heating element 302 applying heat to the inner welded seam region 11B.

By means of using the embodiment of FIG. 2 or the embodiment of FIG. 3, the welded seam 11 becomes heated.

In one embodiment, the heating temperature is substantially between 0.5 and 15 degrees Celsius below the glass transition temperature.

After step 409, while the compressing forces initially applied in step 407 continue to be maintained, the process goes to step 411.

In step 411, the welded seam 11 is cooled for a fixed cooling time period to a cooling temperature. As explained below, this cooling of the welded seam 11 can be done in at least two ways.

In one embodiment, the welded seam 11 is cooled by the means of the compressing and heating element 201 cooling the outer welded seam region 11A as depicted in FIG. 2.

In another embodiment, as depicted in FIG. 3, the welded seam 11 is cooled by means of the first compressing and heating element 201 cooling the outer welded seam region 11A and the second compressing and heating element 302 cooling the inner welded seam region 11B.

By means of using the embodiment of FIG. 2 or the embodiment of FIG. 3, the welded seam 11 becomes cooled.

In one embodiment, the cooling temperature is substantially room temperature.

In one embodiment, the cooling step 411 comprising a step of cooling the single heating element 201 of FIG. 2 or the two heating elements 201 and 302 of FIG. 3 with a fluid. In one embodiment, the fluid comprises water.

It will be appreciated that step 407's compressing, step 409's heating and step's 411 cooling ultimately result in reducing the surface roughness of the welded seam 11. The foregoing reduction of welded seam 11's surface roughness includes, without limitation, the elimination of the protrusion spike 101.

After step 411, while the compressing forces initially applied in step 407 continue to be maintained, the process goes to step 413.

In step 413, it is determined when the surface roughness of the welded seam 11, which surface roughness currently has been reduced as a cumulative result of the step 407 compressing, step 409 heating and step 411 cooling, is satisfactory.

In one embodiment, step 413 includes a step of determining when the protrusion spike 101 of the welded seam 11 has been eliminated.

In another embodiment, step 413 includes a step of determining when the surface roughness of the welded seam 11 has been reduced by an acceptable amount. For example, in one embodiment an acceptable amount of surface roughness reduction of the welded seam 11 comprises about 40% with respect to the original roughness of the welded seam 11.

In one embodiment, the determining step 413 comprises a step of determining a total (cumulative) heating period during which the welded seam 11 has been heated. For example, in one embodiment the determining step 413 determines when the heating step 409 has been performed a fixed number of times.

When step 413 determines that the surface roughness of the welded seam 11 is not satisfactory (corresponding to a step 413 NEGATIVE result depicted as the "NO" branch in FIG. 4), the process returns to step 409, whereupon the heating step 409, cooling step 41 1, and determining step 413 are repeated.

Otherwise, when step 413 determines that the surface roughness of the welded seam 11 is satisfactory (corresponding to a step 413 POSITIVE result depicted as the "YES" branch in FIG. 4), the process goes to step 415.

In step 415, the compressing initially begun in prior step 407 now ceases.

In one embodiment, the imaging belt 10 comprises a photoreceptor belt.

In a further embodiment, the imaging belt 10 comprises an electroreceptor belt.

In a still further embodiment, the imaging belt 10 comprises an intermediate image transfer belt.

In summary, there is provided a method (depicted in FIG. 4) for reducing surface roughness in a welded seam 11 of an imaging belt 10, the imaging belt 10 comprising first 12 and second 14 ends, the first 12 and second 14 ends overlapping and thereat joined by a welded seam 11 (comprising outer welded seam region 11A and inner welded seam region 11B), the welded seam 11 comprising a surface roughness including a protrusion spike 101, the belt 10 comprising an imaging layer 16, a glass transition temperature corresponding to the imaging layer, the method comprising the steps of:

at a controlled pressure, compressing (step 407) a belt portion comprising the welded seam 11 and belt end portions adjacent thereto and, while compressing:

heating (step 409) the welded seam 11 to a heating temperature near but less than the glass transition temperature;

then cooling (step 411) the welded seam 11 to a cooling temperature;

the compressing, heating and cooling reducing the surface roughness (as well as eliminating the protrusion spike 101); and then determining (step 413) when the surface roughness is satisfactory.

The method further comprises a step of repeating (corresponding to the negative or "NO" result of determining step 413) the heating, cooling and determining steps (respectively steps numbered 409, 411 and 413) until the determining step (reference number 413) determines that the surface roughness of the welded seam 11 is satisfactory.

Also, the method comprises a step (415) of ceasing (corresponding to the positive or "YES" result of determining step 413) the compressing (which was begun in step 407) when the determining step (413) determines that the surface roughness of the welded seam 11 is satisfactory.

While various embodiments of a method for reducing surface roughness in a welded seam of an imaging belt, in accordance with the present invention, have been described hereinabove, the scope of the invention is defined by the following claims.

What is claimed is:

1. A method for reducing surface roughness in a welded seam of an imaging belt, the imaging belt comprising first and second ends, the first and second ends overlapping and thereat joined by a welded seam, the welded seam comprising a surface roughness, the belt comprising an imaging layer, a glass transition temperature corresponding to the imaging layer, the method comprising the steps of:

at a controlled pressure, compressing a belt portion comprising the welded seam and belt end portions adjacent thereto and, while compressing:

heating the welded seam to a heating temperature near but less than the glass transition temperature;

then cooling the welded seam to a cooling temperature;

the compressing, heating and cooling reducing the surface roughness; and then determining when the surface roughness is satisfactory.

2. The method of claim 1, the surface roughness comprising a protrusion spike.

3. The method of claim 1, the welded seam formed by means of an ultrasonic welding method.

4. The method of claim 1, the controlled pressure substantially between 40 and 80 pounds per square inch.

5. The method of claim 1, the heating temperature substantially between 0.5 and 15 degrees Celsius below the glass transition temperature.

6. The method of claim 1, the cooling temperature substantially at room temperature.

7. The method of claim 2, further comprising a step of repeating the heating, cooling and determining steps until the determining step determines that the surface roughness is satisfactory.

8. The method of claim 7, including a step of determining when the protrusion spike has been eliminated.

9. The method of claim 7, including a step of determining when the surface roughness has been reduced by about 40% with respect to its original roughness.

10. The method of claim 1, comprising a step of ceasing the compressing when the determining step determines that the surface roughness is satisfactory.

11. The method of claim 1, the heating step performed for a fixed heating time period.

12. The method of claim 11, the determining step comprising determining when the heating step has been performed a fixed number of times.

13. The method of claim 1, the imaging belt comprising outer and inner surfaces, the heating step comprising a step of applying heat to the outer surface.

14. The method of claim 13, the heating step further comprising a step of applying heat to the inner surface.

15. The method of claim 1, the heating step performed by means of at least one heating element, the cooling step comprising a step of cooling the at least one heating element with a fluid.

16. The method of claim 15, the fluid comprising water.

17. The method of claim 1, the imaging belt being flexible.

18. The method of claim 17, the imaging belt comprising a photoreceptor belt.

19. The method of claim 17, the imaging belt comprising an electroreceptor belt.

20. The method of claim 17, the imaging belt comprising an intermediate image transfer belt.

* * * * *